United States Patent
Reiff et al.

(10) Patent No.: US 9,881,219 B2
(45) Date of Patent: Jan. 30, 2018

(54) SELF-RECOGNITION OF AUTONOMOUS VEHICLES IN MIRRORED OR REFLECTIVE SURFACES

(71) Applicant: Ford Global Technologies, LLC, Dearborn, MI (US)

(72) Inventors: Brielle Reiff, Cincinnati, OH (US); Madeline Jane Schrier, Palo Alto, CA (US); Nithika Sivashankar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 14/877,115

(22) Filed: Oct. 7, 2015

(65) Prior Publication Data
US 2017/0103270 A1    Apr. 13, 2017

(51) Int. Cl.
| | | |
|---|---|---|
| G06K 9/78 | (2006.01) | |
| G06K 9/80 | (2006.01) | |
| B60T 7/12 | (2006.01) | |
| G06K 9/00 | (2006.01) | |
| B60T 7/22 | (2006.01) | |
| B62D 15/02 | (2006.01) | |
| G05D 1/00 | (2006.01) | |
| G06K 9/32 | (2006.01) | |
| G06K 9/46 | (2006.01) | |
| G06K 9/52 | (2006.01) | |
| G06K 9/62 | (2006.01) | |
| G06T 7/90 | (2017.01) | |

(52) U.S. Cl.
CPC ............ *G06K 9/00805* (2013.01); *B60T 7/22* (2013.01); *B62D 15/0265* (2013.01); *G05D 1/0088* (2013.01); *G06K 9/00832* (2013.01); *G06K 9/325* (2013.01); *G06K 9/4652* (2013.01); *G06K 9/52* (2013.01); *G06K 9/6215* (2013.01); *G06T 7/90* (2017.01); *B60T 2201/022* (2013.01); *B60T 2210/32* (2013.01); *G06T 2207/30204* (2013.01); *G06T 2207/30261* (2013.01); *G06T 2207/30268* (2013.01)

(58) Field of Classification Search
None
See application file for complete search history.

(56) References Cited

U.S. PATENT DOCUMENTS

| 4,968,878 A | 11/1990 | Pong |
|---|---|---|
| 8,126,642 B2 | 2/2012 | Trepagnier |

(Continued)

*Primary Examiner* — Rami Khatib
*Assistant Examiner* — Gerrad A Foster
(74) *Attorney, Agent, or Firm* — David R. Stevens; Stevens Law Group (57) ABSTRACT

A controller for an autonomous vehicle receives an image stream from one or more imaging devices. The controller identifies vehicle images in the image stream. Vehicle images are compared to the color, shape, badging, markings, license plate, and driver of the autonomous vehicle. If the vehicle image is determined to match the autonomous vehicle, then the vehicle image is ignored as a potential obstacle. The location of a reflective surface that generated the vehicle image may be determined and added to a set of potential obstacles. The color and shape of a vehicle in a vehicle image may be evaluated first. Only if the color and shape in the vehicle image match the autonomous vehicle are other factors such as badging, markings, license plate, and driver considered. Vehicle images not matching the autonomous vehicle are included in a set of potential obstacles.

19 Claims, 4 Drawing Sheets

(56) References Cited

U.S. PATENT DOCUMENTS

| 8,139,109 B2 | 3/2012 | Broggi |
| 2010/0026555 A1 | 2/2010 | Whittaker |
| 2015/0048738 A1 | 2/2015 | Falb |

SELF-RECOGNITION OF AUTONOMOUS VEHICLES IN MIRRORED OR REFLECTIVE SURFACES

BACKGROUND

Field of the Invention

This invention relates to performing obstacle avoidance in autonomous vehicles.

Background of the Invention

Autonomous vehicles are equipped with sensors that detect their environment. An algorithm evaluates the output of the sensors and identifies obstacles. A navigation system may then steer the vehicle, brake, and accelerate to both avoid the identified obstacles and reach a desired destination. Sensors may include both imaging systems, e.g. video cameras, as well as RADAR or LIDAR sensors.

The systems and methods disclosed herein provide an improved approach for detecting obstacles using exclusively optical images.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
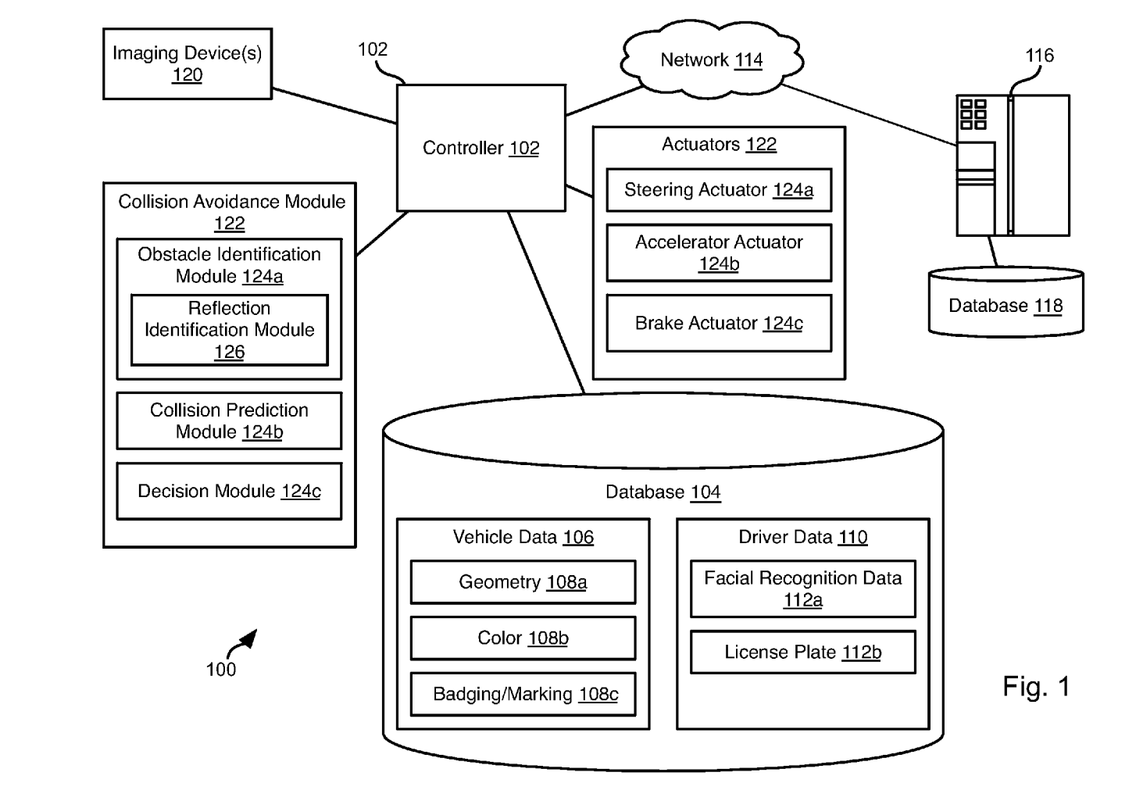
FIG. 1 is a schematic block diagram of a system for implementing embodiments of the invention.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, image data may be analyzed to identify vehicle images that are in fact a reflection of the vehicle in which the controller 102 is housed or the vehicle being controlled by the controller 102.

The controller 102 may include or access a database 104 housed in the vehicle or otherwise accessible by the controller 102. The database 104 may include data sufficient to enable identification of a reflection of the vehicle. For example, vehicle data 106 may contain data describing a vehicle such as the geometry 108a (e.g. shape) of the vehicle. The geometry data 108a may be a three-dimensional model of the vehicle enabling an image of the vehicle from various viewpoints to be generated. The vehicle data 106 may include data describing the color 108b of the vehicle. The color data 108b may be incorporated into the three-dimensional model, i.e. the model may be a color model of the vehicle. The vehicle data 106 may include other data describing badging and other markings 108c. Badging and marking may include logos, labels, stripes, or other painted patterns or decals. Markings may further include visible damage to the vehicle, e.g. scratched paint, dents, etc. In some embodiments, some or all of the data 108a, 108c may be mirrored inasmuch as the images evaluated using the data 108a, 108c are evaluated to determine whether they are reflections of the vehicle.

The database 104 may further include driver data 110 that may be used to determine whether a vehicle image is a reflection of the vehicle. For example, the driver data 110 may include facial recognition data 112a. The facial recognition data 112a may include actual images of one or more drivers associated with a vehicle or data derived from analyzing the faces of the one or more drivers, i.e. the location of various features of the faces of the one or more drivers that may be used to uniquely identify them. The driver data 110 may further include a license plate number 112b of the vehicle, which may be stored as one or both of an image of the license plate or as data represented just the letters and numbers of the license plate. The facial recognition data 112a and a license plate image in license plate data 112b may be mirrored to matching to faces and license plates in a reflected image.

In some embodiments, the controller 102 may periodically connect to a network 114, such as the Internet or other network. The controller may retrieve some or all of the data stored in the database 104 from one or more servers 116 hosting or accessing a database 118 storing such information. For example, a photo of a user may be retrieved to obtain facial recognition data 112a, license plate data 112b may be retrieved from a government licensing database, and vehicle data 106 may be retrieved from a manufacturer's database.

The controller 102 may receive one or more image streams from one or more imaging devices 120. For example, one or more cameras may be mounted to the vehicle and output image streams received by the controller 102.

The controller may execute a collision avoidance module 122 that receives the image streams and identifies possible obstacles and takes measures to avoid them. In the embodiments disclosed herein, only image data is used to perform collision avoidance. However, other sensors to detect obstacles may also be used such as RADAR, LIDAR, SONAR, and the like.

The collision avoidance module 122 may include an obstacle identification module 124a that analyzes the one or more image streams and identifies potential obstacles, including people, animals, vehicles, buildings, curbs, and other objects and structures. In particular, the obstacle identification module 124a may identify vehicle images in the image stream. The obstacle identification module 124a may include a reflection identification module 126 that identifies which vehicle images are actually reflections of the vehicle, thereby excluding them as potential obstacles and identifying reflective surfaces. The method by which reflections of the vehicle are identified are described in greater detail below.

The collision avoidance module 122 may further include a collision prediction module 124b that predicts which obstacle images are likely to collide with the vehicle based on its current trajectory or current intended path. A decision module 124c may make a decision to stop, accelerate, turn, etc. in order to avoid obstacles. The manner in which the collision prediction module 124b predicts potential collisions and the manner in which the decision module 124c takes action to avoid potential collisions may be according to any method or system known in the art of autonomous vehicles.

The decision module 124c may control the trajectory of the vehicle by actuating one or more actuators 122 controlling the direction and speed of the vehicle. For example, the actuators 122 may include a steering actuator 124a, accelerator actuator 124b, and a brake actuator 124c. The configuration of the actuators 124a-124c may be according to any implementation of such actuators known in the art of autonomous vehicles.

Figure 2:
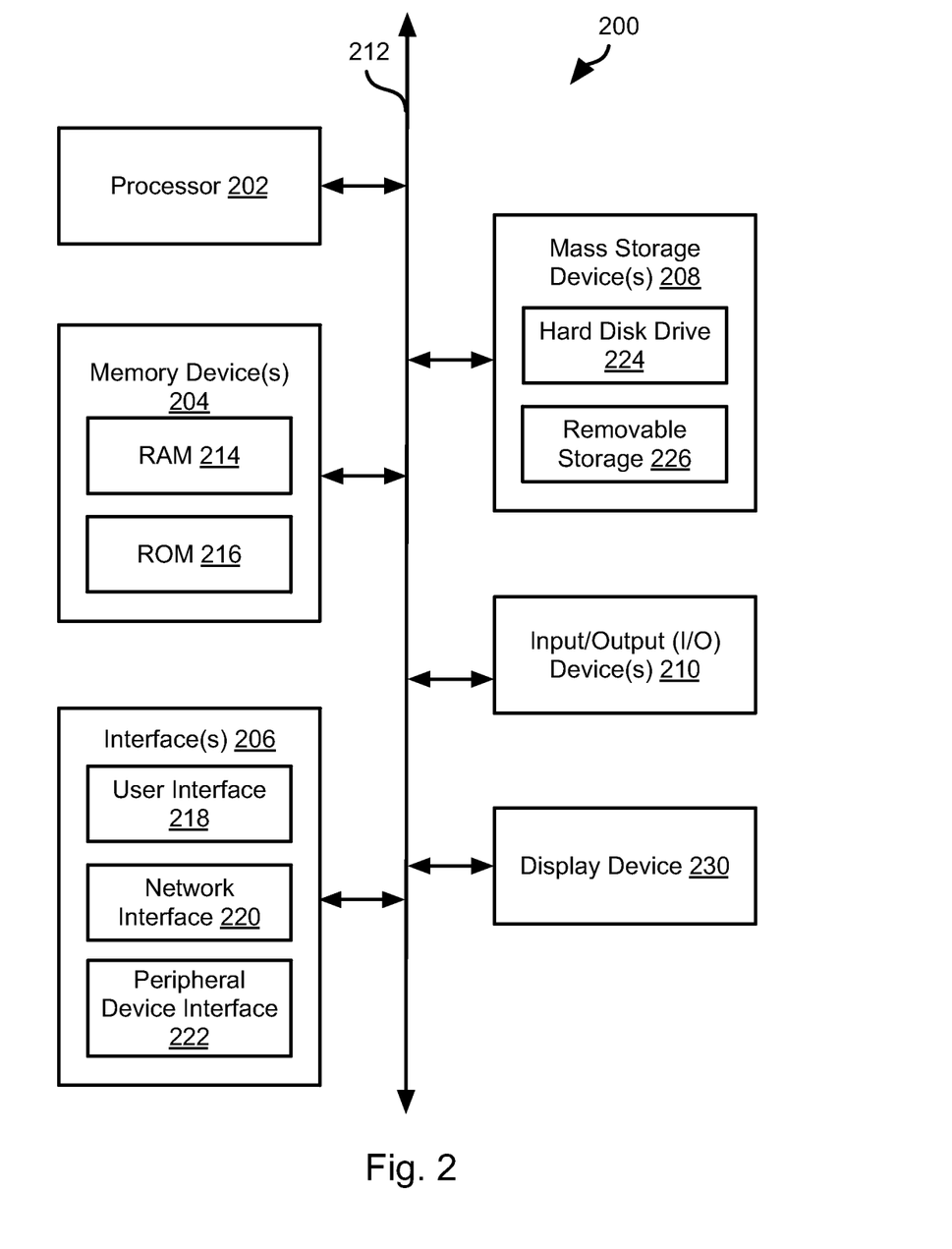
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
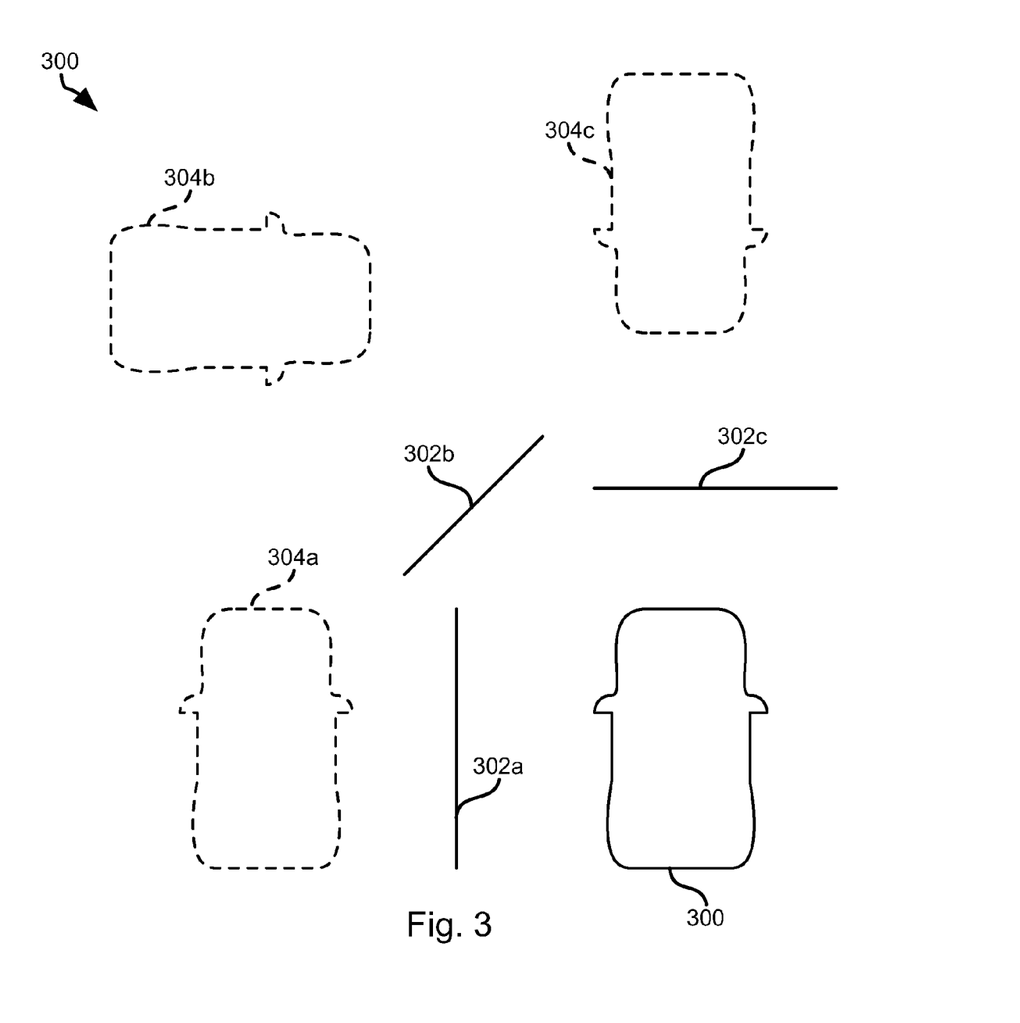
FIG. 3 is a diagram of the detection of vehicle reflections detected in accordance with an embodiment of the present invention.

Turning now to FIG. 3, the vehicle controlled by the controller 102, hereinafter the vehicle 300, may be driven near one or more reflective surfaces 302a-302c oriented at various angles relative to the vehicle 300. For example, reflective surface 302a may run parallel to the direction of travel of the vehicle 300 resulting in a reflection 304a that appears to be driving parallel to the vehicle 300 at a distance equal to two times the distance between the vehicle 300 and the reflective surface 302a.

Likewise, a reflective surface 302b at a non-parallel and non-perpendicular angle will result in a reflection 304b that appears to be driving at an angle two times the angle between the reflective surface 302b and the driving direction of the vehicle. A reflective surface 302c that is perpendicular to the direction of travel of the vehicle 300 will result in a reflection 304c that appears to be heading directly at the vehicle 300.

In all of these cases, images of the reflections detected by the controller 102 might result in taking evasive action. Likewise, the reflective surfaces 302a-302c themselves might not be observed. Accordingly, the systems and methods disclosed herein provide for identifying both reflected images and reflective surfaces in order to more correctly identify potential obstacles.

Figure 4:
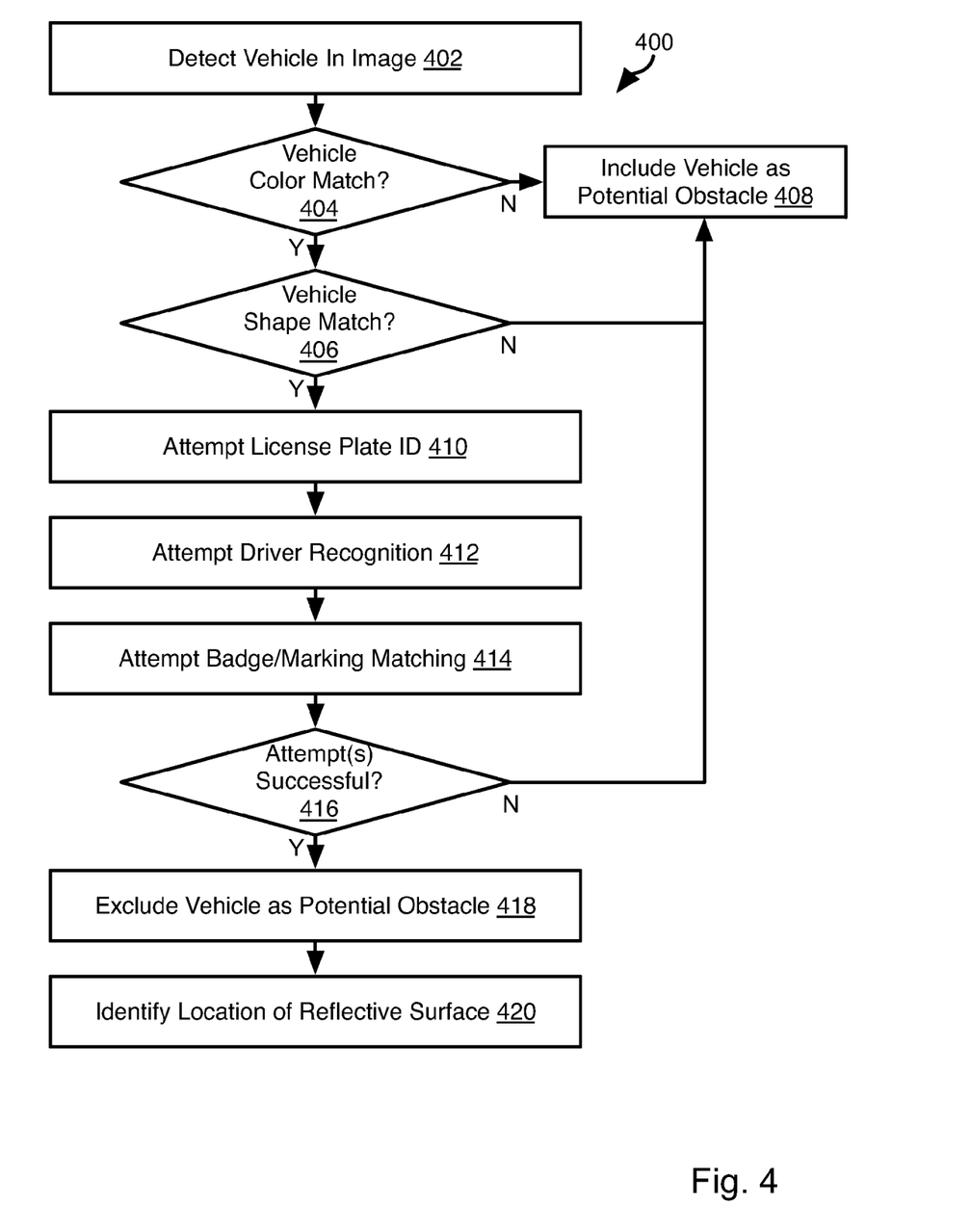
FIG. 4 is a process flow diagram of a method for determining whether an image of a vehicle is a reflection of an autonomous vehicle in accordance with an embodiment of the present invention.

FIG. 4 illustrates a method 400 for identifying reflections of the vehicle 300. The method may include detecting 402 a vehicle in an image. For example, all vehicles in one or more image streams may be identified and then some or all of the vehicle images may then be processed according to the method 400 to determine whether the vehicle image is a reflection of the vehicle or some other vehicle.

The method 400 may include evaluating 404, 406 whether both of the color of the vehicle image and the shape of the vehicle in the vehicle image match that of the vehicle 300. In particular, the color and shape of the vehicle in the vehicle image may be compared to the vehicle data 106, including the geometry and color data 108a, 108b. The steps 404, 406 are shown as separate steps but may be performed substantially simultaneously. For example, a rendering of color 3D model of the vehicle 300 may be mirrored (if not stored as a mirrored model) and translated and/or rotated to match the orientation of the vehicle in the image. If a rendering of the 3D model oriented to match the vehicle in the vehicle image matches both shape and color of the vehicle in the vehicle image, the conditions of steps 404, 406 may be deemed satisfied. Otherwise, the vehicle may be determined not to be the vehicle 300 and will be included 408 as a potential obstacle when performing collision avoidance.

In some embodiments, steps 404, 406 may be separate steps such that step 406 is performed only if a color match is found at step 404. Inasmuch as color may require much less processing, vehicle images that are clearly the wrong color may be excluded as potential reflections and eliminating the need to evaluate the shape of the vehicle in the vehicle image at step 406.

If the color and shape of the vehicle in the vehicle image are found to match in steps 404, 406, other features of the vehicle in the vehicle image may be compared to vehicle data 106 and driver data 110 in order to determine whether the vehicle image is a reflection.

For example, the method 400 may include attempting 410 to match a license plate in the vehicle image to the license plate of the vehicle 300 as recorded in the license plate data 112b. This may include attempting to match a license plate of the vehicle 300 to a mirrored image of the license plate of the vehicle 300. If a match is found, a score may be assigned to this comparison step, e.g. a score that increases with similarity of an image of a license plate in the vehicle image to a mirror image of the license plate of the vehicle 300. The score may be assigned based on identifying the numbers and/or letters of the license plate in the vehicle image, with the score increasing with the length of the sequence of numbers and/or letters of the license plate in the vehicle image that correspond to all or part the license plate data 112b found in the vehicle image.

Alternatively, step 410 may simply produce a binary output, e.g. yes or 1 if a match is found and no or zero is no match is found. In some embodiments, if the license plate of a vehicle image is found to match the license plate data 112b with high certainty, e.g. each and every letter and number in the correct sequence is found in a license plate of the vehicle image, then the vehicle image is determined to be a reflection regardless of whether other attempts 412-414 to identify matching features are successful. In some embodiments, steps 412-414 may be omitted if step 410 is successful. In other embodiments, steps 412 and 414 are performed regardless of the success of the attempt in step 410.

The method 400 may include attempting 412 to match a driver detected in the vehicle image to facial recognition data 112a. This may include attempting to match an image of a driver in the vehicle image to a mirrored image of the driver. Attempting 412 matching may include using any facial recognition technology known in the art. In particular, the facial recognition data 112a may include data defining the location of mirrored facial features of one or more drivers rather than an actual image of the one or more drivers. The locations of these features may then be extracted from an image of a driver in a vehicle image and compared to those in the facial recognition data 112a. If a match is found, a score may be assigned to this comparison step, e.g. a score that increases with similarity of a driver image in the vehicle image to the facial recognition data 112a.

Alternatively, step 412 may simply produce a binary output, e.g. yes or 1 if a match is found and no or zero is no match is found. For example, facial recognition algorithms output a confidence score indicating likelihood that two images include the same face. Accordingly, if this confidence score is greater than a threshold value, the output may be yes or 1, otherwise the output may be no or zero. In the case where the output is yes or 1, others of the attempts 410, 414 may be omitted. In other embodiments, the other attempts 410, 414 are made regardless of the success of the attempt 412.

The method 400 may include attempting 414 to match badging or distinguishing markings in the vehicle image to the badging and marking data 108c. If a match is found between one or more items of badging or distinguishing marks, a score may be assigned to this comparison step, e.g. a score that increases with a number of items of badging and/or markings in the vehicle image that match corresponding badging and/or markings in the data 108c.

Alternatively, step 414 may simply produce a binary output, e.g. yes or 1 if a match is found and no or zero is no match is found. For example, if all badging and markings visible in the portion of a vehicle visible in the vehicle image correspond to those that would be visible if the vehicle 300 were viewed from the same angle/distance, the output may be yes or 1, otherwise the output may be no or zero. In the case where the output is yes or 1, others of the attempts 410, 412 may be omitted. In other embodiments, the other attempts 410, 412 are made regardless of the success of the attempt 414.

The method 400 may include determining 416 whether one or more of the attempts 410-414 to identify matching features in the vehicle image were successful. For example, where steps 410-414 output a binary output, if any one of the binary outputs is yes or 1, then step 416 may conclude that at least one attempt was successful.

In some embodiments, the outputs of the attempts 410-414 is a score. These scores may be summed, weighted and summed, or input to a function to produce a final score. This final score may be compared to a threshold. If the score exceeds the threshold, then the attempts may be determined 416 to have been successful. If the score does not exceed the threshold, then the attempt may be determined 416 not to have been successful.

If the attempts 410-414 are determined 416 not to have been successful the vehicle image is included as a potential obstacle. If the attempts 410-414 are determined 416 to be successful, then the method 400 may include excluding 418 the vehicle image from consideration as a potential obstacle and identifying 420 the location of the reflective surface that produced the vehicle image. For example, the reflective surface may be determined to be halfway between a virtual location of the vehicle image and the vehicle 300. For example, as shown in FIG. 3, the images 304a-304c appear to be at a location that is twice the distance between the vehicle 300 and the reflective surface 302a-302c. Accordingly, if the location of the image is determined, such as using stereoscopic vision or other range finding technique, then the reflective surface may be identified 420 as halfway from the vehicle 300 to that location.

In some embodiments, the location identified at step 420 may be uploaded to a database 118 accessible by other vehicles 300. Accordingly, other vehicles may download this information to facilitate the identification of vehicle images that are reflections. For example, when evaluating a vehicle image that matches the color and shape of the vehicle 300, if the vehicle 300 is adjacent a known reflective surface a confidence or score indicating that the vehicle image is a reflection may be increased.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A controller for an autonomous vehicle comprising:
one or more processing devices programmed to—
receive one or more image streams from one or more imaging devices;
identify a plurality of vehicle images in the one or more image stream; and
identify any matching vehicle images among the plurality of vehicle images, the any matching vehicle images matching image data describing the autonomous vehicle with certainty exceeding a threshold;
identify a set of potential obstacles from the plurality of vehicle images excluding the any matching vehicle images; and
perform autonomous collision avoidance with respect to the set of potential obstacles;
wherein the one or more processing devices are further programmed to identify the any matching vehicles by, for each image of the plurality of images—
retrieve a mirrored three-dimensional (3D) model of the autonomous vehicle;
orient the mirrored 3D model in correspondence with the each image;
compare the each image to a rendering of the mirrored 3D model;
if the each image matches the rendering, select the each image as one of the any matching images.

2. The controller of claim 1, wherein the one or more processing devices are further programmed to:
identify, for each image of the any matching images, a location of a reflective surface reflecting an image of the autonomous vehicle; and
add the reflective surface to the set of potential obstacles.

3. The controller of claim 1, wherein the one or more processing devices are further programmed to identify the any matching images by, for each vehicle image of at least a portion of the plurality of vehicle images by:
evaluating a shape and color of the each vehicle image with respect to a shape and color of the autonomous vehicle recorded in the image data describing the autonomous vehicle.

4. The controller of claim 1, wherein the one or more processing devices are further programmed to identify the any matching images by, for each vehicle image of at least a portion of the plurality of vehicle images by:
   evaluating a license plate in the each vehicle image with respect to a license plate recorded in the image data describing the autonomous vehicle.

5. The controller of claim 1, wherein the one or more processing devices are further programmed to identify the any matching images by, for each vehicle image of at least a portion of the plurality of vehicle images by:
   evaluating a driver image in the each vehicle image with respect to a driver image recorded in the image data describing the autonomous vehicle.

6. The controller of claim 1, wherein the one or more processing devices are further programmed to identify the any matching images by, for each vehicle image of at least a portion of the plurality of vehicle images by:
   evaluating badging in the each vehicle image with badging recorded in the image data describing the autonomous vehicle.

7. The controller of claim 1, wherein the one or more processing devices are further programmed to identify the any matching images by, for each vehicle image of at least a portion of the plurality of vehicle images by:
   evaluating distinguishing markings in the each vehicle image with distinguishing markings recorded in the image data describing the autonomous vehicle.

8. The controller of claim 1, wherein the one or more processing devices are further programmed to identify the any matching images by, for each vehicle image of at least a portion of the plurality of vehicle images by:
   evaluating a shape and color of the each vehicle image with respect to a shape and color of the autonomous vehicle recorded in the image data describing the autonomous vehicle;
   if (a) the shape and color of the each vehicle image do not match the shape and color of the autonomous vehicle, including the each vehicle in the set of potential obstacles
   if not (a), evaluating at least one of—
      (i) attempt to match a license plate in the each vehicle image to a license plate recorded in the image data describing the autonomous vehicle;
      (ii) attempt to match a driver image in the each vehicle image to a driver image recorded in the image data describing the autonomous vehicle;
      (iii) attempt to match badging in the each vehicle image to badging recorded in the image data describing the autonomous vehicle;
      (iv) attempt to match distinguishing markings in the each vehicle image to distinguishing markings recorded in the image data describing the autonomous vehicle;
      if one or more of (i) through (iv) are successful, determine that the each vehicle image matches the autonomous vehicle with certainty exceeding a threshold.

9. The controller of claim 1, wherein the one or more processing devices are further programmed to identify the any matching images by, for each vehicle image of at least a portion of the plurality of vehicle images by:
   evaluating a shape and color of the each vehicle image with respect to a shape and color of the autonomous vehicle recorded in the image data describing the autonomous vehicle;
   if (a) the shape and color of the each vehicle image do not match the shape and color of the autonomous vehicle, including the each vehicle in the set of potential obstacles
   if not (a), evaluating at least one of—
      (i) assign a first score to the each vehicle image according to similarity of a license plate in the each vehicle image to a license plate recorded in the image data describing the autonomous vehicle;
      (ii) assign a second score to the each vehicle image according to similarity of a driver image in the each vehicle image to a driver image recorded in the image data describing the autonomous vehicle;
      (iii) assign a third score to the each vehicle image according to similarity of badging in the each vehicle image to badging recorded in the image data describing the autonomous vehicle;
      (iv) assign a fourth score to the each vehicle image according to similarity of distinguishing markings in the each vehicle image to distinguishing markings recorded in the image data describing the autonomous vehicle;
      if a combination of the first, second, third, and fourth scores exceeds the threshold, determine that the each vehicle image is a reflection of the autonomous vehicle and excluding the each vehicle image from the set of potential obstacles.

10. An autonomous vehicle comprising:
   at least one of a steering actuator, accelerator actuator, and brake actuator;
   one or more imaging devices;
   a controller operably coupled to the one or more imaging devices and the at least one of the steering actuator, the accelerator actuator, and the brake actuator, the controller including one or more processing devices programmed to—
      receive one or more image streams from one or more imaging devices;
      identify a plurality of vehicle images in the one or more image stream;
      exclude from a set of potential obstacles any vehicle images matching image data describing the autonomous vehicle with certainty exceeding a threshold;
      evaluate possible collisions between the autonomous vehicle and the set of potential obstacles, the set of potential obstacles including at least a portion of the plurality of vehicle images excluding the any vehicle images matching the image data describing the autonomous vehicle with certainty exceeding the threshold; and
      perform obstacle avoidance with respect to the set of potential obstacles;
   wherein the one or more processing devices are further programmed to identify the any vehicle images matching the image data describing the autonomous vehicle by, for each image of the plurality of images—
      retrieve a mirrored three-dimensional (3D) model of the autonomous vehicle;
      orient the mirrored 3D model in correspondence with the each image;
      compare the each image to a rendering of the mirrored 3D model; and
      if the each image matches the rendering, select the each image as matching the image data describing the autonomous vehicle.

11. The autonomous vehicle of claim 10, wherein the one or more processing devices are further programmed to:
   identify, for each vehicle image of the plurality of vehicle images that match the image data describing the autonomous vehicle with certainty exceeding the threshold, a location of a reflective surface reflecting an image of the autonomous vehicle; and
   add the reflective surface to the set of potential obstacles.

12. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating a shape and color of the each vehicle image with respect to a shape and color of the autonomous vehicle recorded in the image data describing the autonomous vehicle.

13. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating a license plate in the each vehicle image with respect to a license plate recorded in the image data describing the autonomous vehicle.

14. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating a driver image in the each vehicle image with respect to a driver image recorded in the image data describing the autonomous vehicle.

15. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating badging and distinguishing markings in the each vehicle image with badging and marking data recorded in the image data describing the autonomous vehicle.

16. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating a shape and color of the each vehicle image with respect to a shape and color of the autonomous vehicle recorded in the image data describing the autonomous vehicle;
   if (a) the shape and color of the each vehicle image do not match the shape and color of the autonomous vehicle, including the each vehicle in the set of potential obstacles
   if not (a), evaluating at least one of—
      (i) attempt to match a license plate in the each vehicle image to a license plate recorded in the image data describing the autonomous vehicle;
      (ii) attempt to match a driver image in the each vehicle image to a driver image recorded in the image data describing the autonomous vehicle;
      (iii) attempt to match badging in the each vehicle image to badging recorded in the image data describing the autonomous vehicle;
      (iv) attempt to match distinguishing markings in the each vehicle image to distinguishing markings recorded in the image data describing the autonomous vehicle;
      if one or more of (i) through (iv) are successful, determine that the each vehicle image matches the autonomous vehicle with certainty exceeding a threshold.

17. The autonomous vehicle of claim 10, wherein the one or more processing devices are further programmed to identify the any vehicle images matching the image data describing the autonomous vehicle with certainty exceeding the threshold by, for each vehicle image of at least a portion of the plurality of vehicle images by:
   evaluating a shape and color of the each vehicle image with respect to a shape and color of the autonomous vehicle recorded in the image data describing the autonomous vehicle;
   if (a) the shape and color of the each vehicle image do not match the shape and color of the autonomous vehicle, including the each vehicle in the set of potential obstacles
   if not (a), at least two of—
      (i) assign a first score to the each vehicle image according to similarity of a license plate in the each vehicle image to a license plate recorded in the image data describing the autonomous vehicle;
      (ii) assign a second score to the each vehicle image according to similarity of a driver image in the each vehicle image to a driver image recorded in the image data describing the autonomous vehicle;
      (iii) assign a third score to the each vehicle image according to similarity of badging in the each vehicle image to badging recorded in the image data describing the autonomous vehicle;
      (iv) assign a fourth score to the each vehicle image according to similarity of distinguishing markings in the each vehicle image to distinguishing markings recorded in the image data describing the autonomous vehicle;
      if a combination of at least two of the first, second, third, and fourth scores exceeds the threshold, determine that the each vehicle image is a reflection of the autonomous vehicle and excluding the each vehicle image from the set of potential obstacles.

18. A method for performing collision avoidance for an autonomous vehicle, the method comprising:
   receiving, by a controller device, one or more image streams from one or more imaging devices;
   identifying, by the controller device, a plurality of vehicle images in the one or more image stream;
   identifying, by the controller device, a set of potential obstacles from the plurality of vehicle images not including one or more vehicle images matching image data describing the autonomous vehicle with certainty exceeding a threshold; and
   performing obstacle avoidance with respect to the set of potential obstacles;
   identifying the one or more vehicle images matching the image data describing the autonomous vehicle by, for each image of the one or more vehicle images matching the image data describing the autonomous vehicle—
      retrieving a mirrored three-dimensional (3D) model of the autonomous vehicle;

orienting the mirrored 3D model in correspondence with the each image;
comparing the each image to a rendering of the mirrored 3D model; and
determining that the each image matches the rendering of the mirrored 3D model.

19. The method of claim 18, further comprising:
evaluating, by the controller, possible collisions between the autonomous vehicle and the set of potential obstacles, the set of potential obstacles including at least a portion of the plurality of vehicle images excluding the one or more vehicle images matching the image data describing the autonomous vehicle with certainty exceeding the threshold; and
actuating, by the controller, at least one of a steering actuator, accelerator actuator, and brake actuator of the autonomous vehicle effective to avoid collisions with the set of potential obstacles.

* * * * *